J. E. SOLT.
NUMBER BRACKET.
APPLICATION FILED APR. 22, 1913.
1,100,626.
Patented June 16, 1914.
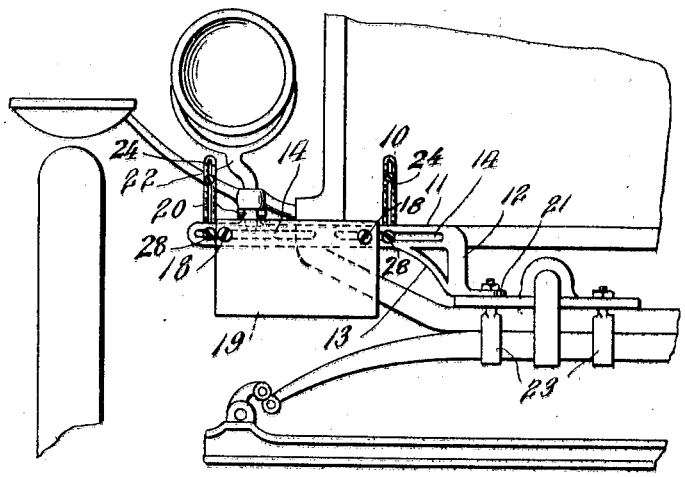
Fig. 1.
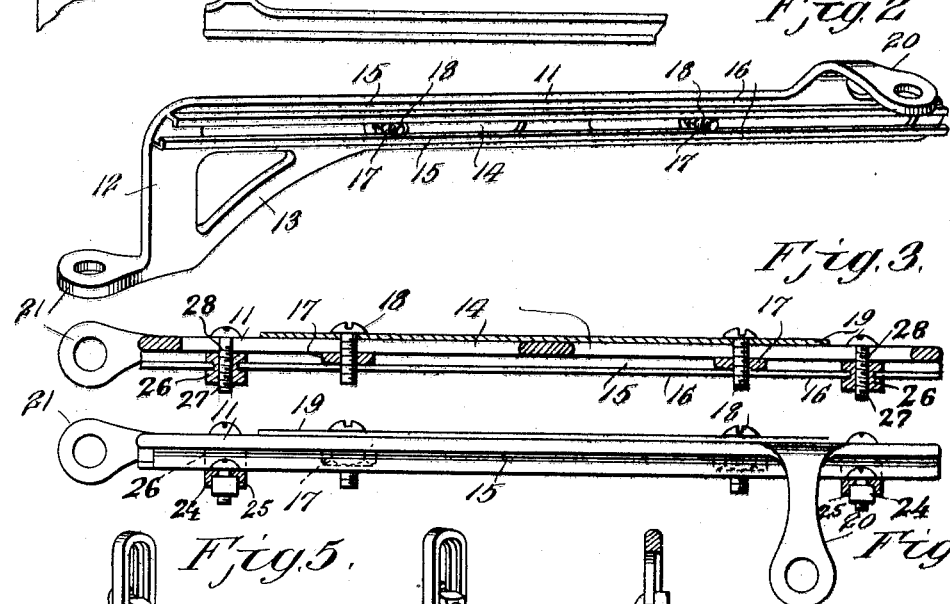
Fig. 2.
Fig. 3.
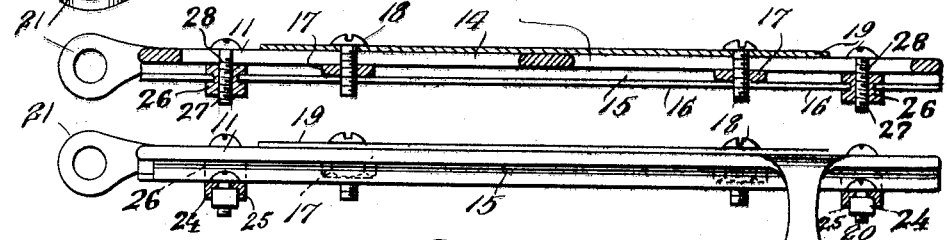
Fig. 4.
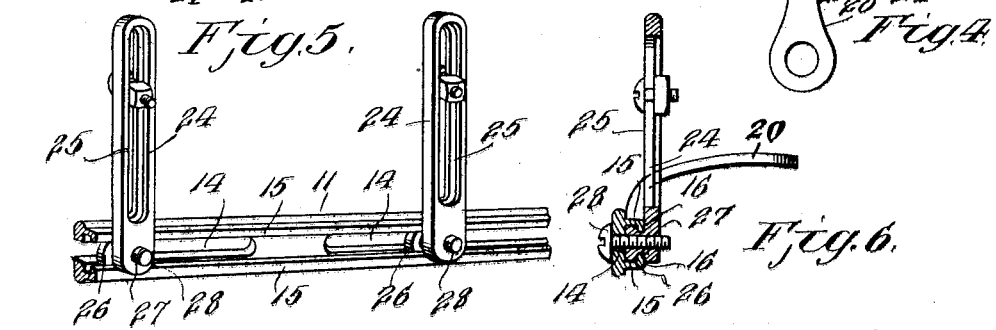
Fig. 5.
Fig. 6.
Witnesses
Frank Hough
[signature]
Inventor
James E. Solt,
By Victor J. Evans
Attorney

UNITED STATES PATENT OFFICE.

JAMES E. SOLT, OF FREDERICK, MARYLAND.

NUMBER-BRACKET.

1,100,626.  Specification of Letters Patent.  Patented June 16, 1914.

Application filed April 22, 1913. Serial No. 762,821.

*To all whom it may concern:*

Be it known that I, JAMES E. SOLT, a citizen of the United States, residing at Frederick, in the county of Frederick and State of Maryland, have invented new and useful Improvements in Number-Brackets, of which the following is a specification.

The invention relates to a license plate bracket or support.

One object of the invention is the provision of a bracket or support wherein the license plate can be conveniently and quickly mounted thereon or removed therefrom.

A further object of the invention is the provision of a bracket or support wherein the fasteners for the license plate are held in the said bracket or support in a novel manner.

A still further object of the invention is the provision of a bracket or support of this character which is extremely simple in construction, possessing rigidity, strength and durability, and also one which is reliable and efficient in its purpose and inexpensive in manufacture.

With these and other objects in view, the invention consists in the construction, combination and arrangement of parts as will be hereinafter fully described, illustrated in the accompanying drawing, and pointed out in the claims hereunto appended.

In the drawing Figure 1 is a fragmentary front elevation of an automobile showing the bracket or support, together with the supplemental hangers, constructed in accordance with the invention applied thereto. Fig. 2 is a perspective view of the bracket or support detached with the supplemental hangers removed. Fig. 3 is a horizontal transverse sectional view through the same, the fasteners for the supplemental hangers being mounted in the bracket. Fig. 4 is a top edge view, with the supplemental hangers connected to the bracket. Fig. 5 is a fragmentary perspective view showing supplemental hangers mounted thereon. Fig. 6 is a vertical transverse sectional view therethrough.

Similar reference characters indicate corresponding parts throughout the several views in the drawing.

Referring to the drawing by numerals, 10 designates generally a portion of an automobile, preferably of the Ford type, with which the license support or bracket is especially designed to be used, the support or bracket being hereinafter more fully described.

The support or bracket comprises a substantially L-shaped member 11 preferably constructed from metal, although the same may be made from any other suitable material, and is formed at its short limb 12 with a brace web 13 which is integral with the long limb thereof, and also integrally formed with its short limb. The member 11 in the long limb thereof is formed with spaced elongated slots 14 which are disposed longitudinally thereof, the same opening into a guideway including a pair of parallel flanges 15 arranged at opposite sides of the slots 14 and projecting outwardly from the inner side of the said member 11. These flanges 15 are formed with in-turned portions 16, and between the said flanges 15 are adjustably received nuts 17 which can be shifted within the guideway longitudinally throughout the greater portion of the length of the member 11. The in-turned portions 16 of the flanges 15 retain the nuts in the guideway to prevent the turning and dropping thereof therefrom when engaging fasteners therein or removing the same therefrom, the fasteners being hereinafter described.

Passed through the slots 15 and threaded in the nuts 17 are bolt members 18 which are also adapted to be passed through perforations formed in a license plate 19 of the ordinary well-known construction, and in this manner the said plate is fastened securely upon the member 11, the latter being fastened to the automobile in a manner hereinafter described.

Formed on the long limb of the member 11 spaced from its end is an arm 20 which is disposed at right angles to the member 11, while formed at the free end of the short limb 12 of the latter is a perforated ear 21, the arm 20 being provided with a suitable perforation adapted to receive the stem of one of the lamp supporting brackets 22 mounted upon the automobile, while the perforated ear 21 is engaged with one end of the spring clip 23 of the automobile, as is clearly shown in Fig. 1 of the drawing, the nuts carried by the lamp supporting bracket 22 and also the nut carried by the end of the spring clip 23 being worked home against the arm 20 and the ear 21 for the secure fastening of the member 11 in position forwardly of the automobile and contiguous to the radiator thereof.

In Figs. 1, 3, 4, 5 and 6 the member 11 is shown carrying a pair of supplemental hangers, each comprising a standard 24 provided with an elongated slot 25 and an offset button or circular shaped head 26 which are adapted to engage in the guideways in the member 11 at the rear side thereof and in the slots 25 are secured suitable fasteners for the securing of an additional license plate should the user of the bracket or support desire to carry on the automobile this additional license plate. The offset button or head 26 and the portion connecting it with the standard 24 is formed with a threaded aperture or hole 27 in which is engaged a screw 28 which binds the button or head 26 in the guideway and thereby securely fastens the supplemental hanger or support thereto. It will be apparent that the supplemental hangers can be angularly adjusted or arranged perpendicularly on the bracket or support for the proper mounting of the additional license plate upon the same. The license plate to be carried by the supporting bracket when the standards 24 are used is fastened to the said bracket by means of the fasteners 18 hereinbefore described, the nuts 17 thereof being engaged in the guide-ways at either side of each of the fasteners for the securing of the standards upon the supporting bracket, the heads 26 of the fasteners being held within the guideways so that they will not interfere with the mounting of the plate on the supporting bracket.

From the foregoing it is thought that the construction and manner of operation of the device will be clearly understood, and therefore a more extended explanation has been omitted.

What is claimed is:—

1. A license plate supporting bracket comprising a member provided with slots, fasteners adjustably engaged in the slots and adapted to secure a license plate to the member, the said fasteners including nuts, and a guideway projecting from one face of the member for receiving the nuts to prevent the turning thereof and having in-turned free edges overlapping the nuts to obviate the dropping thereof from the members.

2. A license plate supporting bracket comprising a member provided with slots, fasteners adjustably engaged in the slots and adapted to secure a license plate to the member, the said fasteners including nuts, a guideway projecting from one face of the member for receiving the nuts to prevent the turning thereof and having in-turned free edges overlapping the nuts to obviate the dropping thereof from the members, supplemental hangers, and means engaged in the hangers and adjustably arranged in the guideway for securing the hangers to the support.

In testimony whereof I affix my signature in presence of two witnesses.

JAMES E. SOLT.

Witnesses:
  FRANK O. PARKER,
  BENNETT S. JONES.

---

Copies of this patent may be obtained for five cents each, by addressing the "Commissioner of Patents, Washington, D. C."